(12) United States Patent
Onal et al.

(10) Patent No.: US 9,027,336 B2
(45) Date of Patent: May 12, 2015

(54) SELF-REGULATING PRESSURE SOURCE

(75) Inventors: Cagdas Denizel Onal, Cambridge, MA (US); Daniela Rus, Weston, MA (US); Xin Chen, Cambridge, MA (US); George M. Whitesides, Newton, MA (US)

(73) Assignees: Massachusetts Institute of Technology, Cambridge, MA (US); President and Fellows of Harvard College, Cambridge, MA (US)

( * ) Notice: Subject to any disclaimer, the term of this patent is extended or adjusted under 35 U.S.C. 154(b) by 575 days.

(21) Appl. No.: 13/420,886

(22) Filed: Mar. 15, 2012

(65) Prior Publication Data
US 2012/0272642 A1 Nov. 1, 2012

Related U.S. Application Data (60) Provisional application No. 61/479,529, filed on Apr. 27, 2011.

(51) Int. Cl.
*F16D 31/02* (2006.01)
*G05D 16/06* (2006.01)
*F15B 21/06* (2006.01)

(52) U.S. Cl.
CPC ............ *G05D 16/0636* (2013.01); *F15B 21/06* (2013.01)

(58) Field of Classification Search
CPC .............................. F15B 21/06; G05D 16/0636
USPC ................ 60/326, 409, 410, 413; 91/5; 92/60
See application file for complete search history.

(56) References Cited

U.S. PATENT DOCUMENTS 3,594,232 A * 7/1971 Spahrbier ...................... 417/118
6,052,992 A * 4/2000 Eroshenko ....................... 60/509

OTHER PUBLICATIONS

Wait K, Jackson P, Smoot L (2010) Self locomotion of a spherical rolling robot using a novel deformable pneumatic method pp. 3757-3762.
Kazerooni H (2005) Design and analysis of pneumatic force generators for mobile robotic systems. IEEE/ASME Transactions on Mechatronics 10:411-418.
Whitehead JC (1998) Hydrogen peroxide, propulsion for smaller satellites.
Vitale F, et al. (2010) Low-temperature H2O2-powered actuators for biorobotics: thermodynamic and kinetic analysis pp. 2197-2202.
Goldfarb M, Barth EJ, Gogola MA, Wehrmeyer JA (2003) Design and energetic characterization of a liquid-propellant-powered actuator for self-powered robots. IEEE/ASME Transactions on Mechatronics 8:254-262.

(Continued)

*Primary Examiner* — Michael Leslie
(74) *Attorney, Agent, or Firm* — Sam Pasternack; MIT Technology Licensing Office (57) ABSTRACT

Self-regulating pressure source. The pressure source includes a chamber enclosing a chemical monopropellant. A moveable boss is attached to a deformable membrane sealing an air chamber, the moveable boss and air chamber being disposed within the chamber. A catalyst is disposed around the membrane so as to be covered by the boss in a retracted position so that the monopropellant is broken down by the catalyst to produce a gas. The gas pressure will increase within the chamber causing air in the air chamber to compress thereby to pull the boss into the retracted position to cover the catalyst thereby to regulate the pressure within the chamber. The self-regulating pressure source is particularly suited to power fluidic elastomeric actuators.

12 Claims, 6 Drawing Sheets

(56) References Cited

OTHER PUBLICATIONS

Wang Y, et al. (2006) Bipolar electrochemical mechanism for propulsion of catalytic nanomotors in hydrogen peroxide solutions. Langmuir 22:10451-10456.

Qin L. Vermesh O, Shi Q, Heath JR (2009) Self-powered microfluidic chips for multiplexed protein assays from whole blood. Lab on a Chip 9:2016-2020.

Salem IA, El-Maazawi M, Zaki AB (2000) Kinetics and mechanisms of decomposition reaction of hydrogen peroxide in presence of metal complexes. Int J Chem Kin 32:643-666.

Albu-Schaffer A, et al (2008) Soft robotics. IEEE Robotics & Automation Magazine 15:20-30.

Pelrine R, Kornbluh R, Pei Q, Joseph J (2000) High-Speed Electrically Actuated Elastomers with Strain Greater Than 100%. Science 287:836-839.

Keplinger C, Kaltenbrunner M, Arnold N, Bauer S (2010) Rontgens electrode-free elastomer actuators without electromechanical pull-in instability. PNAS 107:4505-4510.

Richards AW, Odegard GM (2010) Constitutive modeling of electrostrictive polymers using a hyperelasticity-based approach. Journal of Applied Mechanics 77:014502.

Fu Y, Harvey EC, Ghantasala MK, Spinks GM (2006) Design, fabrication and testing of piezoelectric polymer pvdf microactuators. Smart Materials and Structures 15:S141.

Trivedi D, Rahn C, Kier W, Walker I (2008) Soft robotics: Biological inspiration, state of the art, and future research. Advanced Bionics and Biomechanics 5:99-117.

Oh KW, Ahn CH (2006) A review of microvalves. Journal of Micromechanics and Microengineering 16:R13.

Mosadegh B, et al. (2010) Integrated elastomeric components for autonomous regulation of sequential and oscillatory flow switching in microfluidic devices. Nature Physics 6:433-437.

Thorsen T. Maerkl SJ, Quake SR (2002) Microfluidic Large-Scale Integration. Science 298:580-584.

Chiechi RC, Weiss EA, Dickey MD, Whitesides GM (2008) Eutectic gallium—indium (egain): A moldable liquid metal for electrical characterization of self-assembled monolayers. Angewandte Chemie 47:142-144.

Notification Concerning Transmittal of International Preliminary Report on Patentability for International Patent Application No. PCT/US2012/034772 mailed on Nov. 7, 2013.

Cagdas D Onal et al: "Soft mobile robots with on-board chemical pressure generation", 15th International Symposium on Robotics Research, Aug. 28, 2011, pp. 1-16.

The International Search Report and Written Opinion in issued in connection with International Patent Application No. PCT/US2012/034772 mailed on Jul. 23, 2012.

* cited by examiner

SELF-REGULATING PRESSURE SOURCE

This application claims priority to provisional application Ser. No. 61/479,529 filed on Apr. 27, 2011, the contents of which are incorporated herein by reference.

This invention was made with government support under Grant No. W911NF-08-C-0060, awarded by the Army Research Office. The government has certain rights in this invention.

BACKGROUND OF THE INVENTION

This invention relates to a self-regulating pressure source, and more particularly to such a pressure source adapted to power soft actuators fabricated from elastomer films having embedded fluidic channels.

Pressure is a convenient actuation source for soft actuators as it induces local deformation in a soft substrate [1], giving a large actuation range limited only by the mechanical strength of the material. In general, using direct mechanical energy in the form of pressure bypasses the need for electrical energy and its constraints. On the other hand, an important limitation on fluidic actuation is the necessity of a pressure source [2]. The numbers in the brackets refer to the references included herewith. The contents of all of these references are incorporated herein by reference in their entirety.

Hydrogen peroxide has been used previously as a monopropellant [3] and recently in robotics applications [4, 5, 6]. A recent work utilized $H_2O_2$ to build a self-powered microfluidic lab-on-a-chip system [7]. Using $H_2O_2$ to generate pressure has the benefit of using no conventional power source for operation. Hydrogen peroxide naturally decomposes into oxygen and water with no harmful byproducts at a slow rate. This reaction speeds up in the presence of a catalyst [8]. Once this exothermic reaction starts, it continues until all of the $H_2O_2$ is consumed or the catalyst is removed. In previous works, relief valves were utilized to periodically vent the gas to keep the pressure build-up under control [4].

There is currently a need to develop robotic devices that rely upon new high-performance soft actuators. Compliance allows conformation, which is desirable for adaptability in the device's negotiation with the world. A low minimum stiffness ensures safety in human interaction [9]. Many application areas will benefit from advances in practical soft actuation mechanisms including medical robotics, artificial muscles, and human interaction devices such as tactile or haptic interfaces. A robust pressure source is therefore desirable to advance soft actuator technology.

SUMMARY OF THE INVENTION

According to one aspect, the invention is a self-regulating pressure source including a chamber enclosing a chemical monopropellant. A moveable boss is attached to a deformable membrane sealing an air chamber, the moveable boss and air chamber being disposed within the chamber. A catalyst is disposed around the membrane so as to be covered by the boss in a retracted position. As the monopropellant is broken down by the catalyst to produce gas, pressure will increase within the chamber, causing air in the air chamber to compress thereby to pull the boss into the retracted position to cover the catalyst thereby to regulate pressure within the chamber.

In a preferred embodiment of this aspect of the invention, the monopropellant is hydrogen peroxide. The pressure source further includes an opening in the chamber to allow gas to leave the chamber. In a preferred embodiment, a filter proximate the opening is impervious to liquids while allowing gas to pass through. In a preferred embodiment, the filter is PTFE. In another preferred embodiment the chamber is cylindrical.

In yet another preferred embodiment, the pressure source disclosed herein is operatively connected to an actuator. A suitable actuator is a fluidic elastomer actuator (FEA). A suitable catalyst is silver, platinum or tin. In a preferred embodiment the air chamber is closed but in another embodiment may be opened to the atmosphere.

In another aspect, the invention is a fluidic elastomer actuator including an elastomeric structure including fluidic channels embedded therein and a pressure source for pressurizing the fluidic channels. The pressure source comprises a chamber enclosing a chemical monopropellant along with a moveable boss attached to a deformable membrane sealing an air chamber, the moveable boss and air chamber being disposed within the chamber. A catalyst is disposed around the membrane so as to be covered by the boss in a retracted position. As the monopropellant is broken down by the catalyst to produce gas, pressure will increase within the chamber causing air in the air chamber to compress thereby to pull the boss into the retracted position to cover the catalyst thereby to regulate the pressure within the chamber.

DESCRIPTION OF THE PREFERRED EMBODIMENT

Our invention is to utilize a chemical approach to achieve portable and silent pressure generation. This is the equivalent of a battery for fluidic systems as it offloads pressure generation to a controlled gas generating chemical process. Specifically, we disclose on-demand pressure generation by the mechanical self-regulation of the decomposition of hydrogen peroxide ($H_2O_2$) into oxygen ($O_2$) gas in a closed container. Other monopropellants may also be used. Suitable monopropellants include hydrazine ($N_2O_4$), hydroxyl ammonium nitrate (HAN) ($NH_3OH$)($NO_3$), triethanol ammonium nitrate (TEAN) [$HN(C_2H_4OH)3$]($NO_3$), and hydrozinium nitroformate (HNF) ($N_2H_5$)[$C(NO_2)_3$] with suitable catalysts. An aqueous $H_2O_2$ solution is the fuel in a preferred embodiment. It provides high power and is easily replaced with a fresh solution when depleted. Pure $H_2O_2$ has a theoretical energy density of 2.7 kJ/g, one of the highest in common monopropellant fuels. While this optimal value cannot be fully utilized at room temperature operation, it indicates the potential of $H_2O_2$ as a practical power source. A feature of our portable pneumatic battery design is its rotation-invariant usage, which enables the battery to operate in any orientation.

Figure 1A:
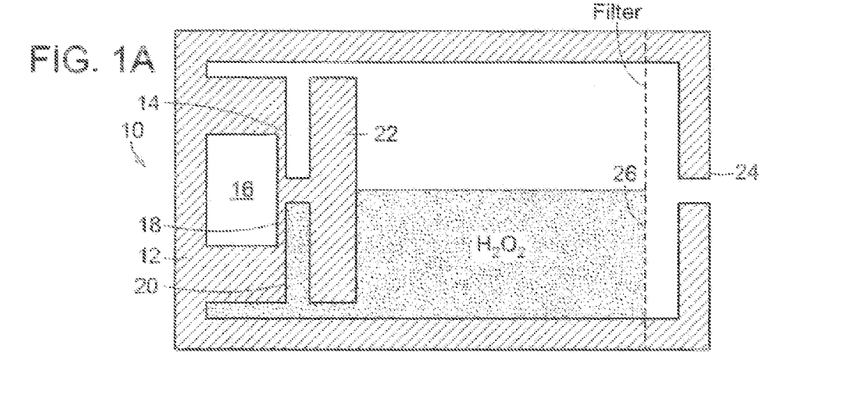
FIGS. 1A and 1B are schematic illustrations of an embodiment of the self-regulating pressure source disclosed herein.
Figure 1B:
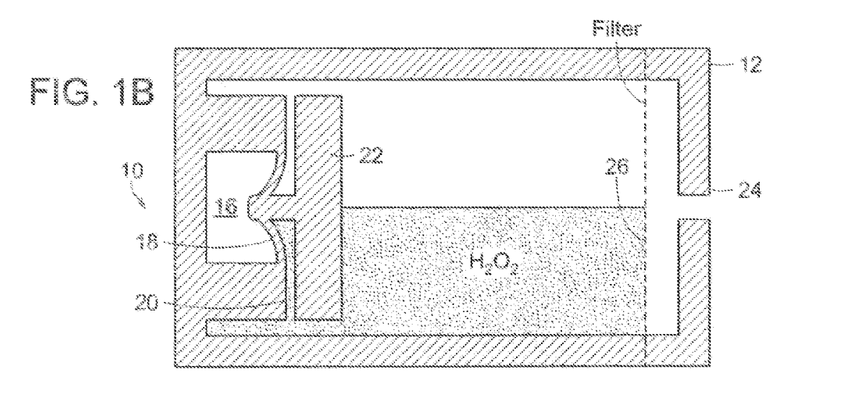
Figure 1C:
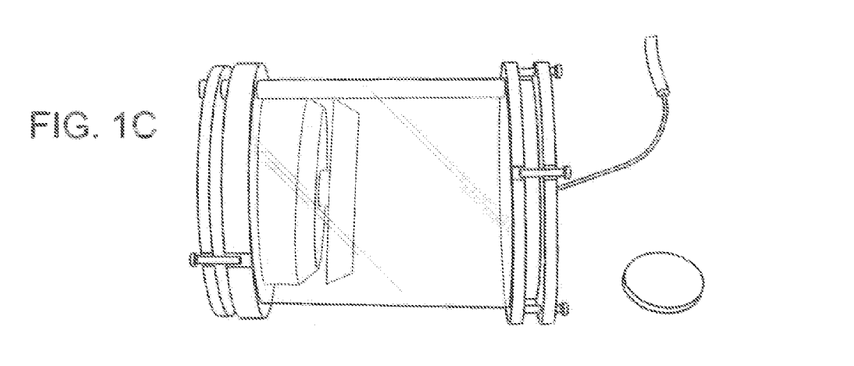
FIG. 1C is a photograph of a prototype embodiment of the self-regulating chemical pneumatic battery mechanism disclosed herein.

A pneumatic battery or pump mechanism that enables self-regulation in pressure generation from an aqueous $H_2O_2$ solution is depicted in FIG. 1 with a sketch and corresponding prototype. With reference to FIGS. 1A, B and C, a pneumatic battery 10 has a cylindrical body 12, which makes it rotationally invariant. On one side resides an elastomeric deflector 14 that embeds a cylindrical air chamber 16 at atmospheric pressure sealed off from the main chamber 10 by a thin circular membrane 18. The deflection of the membrane 18 is dependent upon the pressure in the pneumatic battery 10. Self-regulation is achieved by this deflection, creating a mechanical feedback loop as will become clear below.

As catalyst, thin sheets 20 of silver (Ag) are placed on the deflector 14, around the membrane 18. The membrane 18 is offset from another disk-shaped elastomeric layer with a boss 22 by a defined distance. With increasing pressure, the membrane 18 deflects inside and pulls the soft layer with boss 22 towards the catalyst 20 pack. At a cut-off pressure value, the opposite layer completely conforms to the catalyst surface and stops the reaction thereby to self-regulate the pressure.

An outlet 24 is placed on the other side of the pneumatic battery to use the generated gas pressure for actuation. The gas is filtered by a polytetrafluoroethylene (PTFE) membrane 26 with sub-micron pores. The hydrophobic nature of this filter keeps the solution inside while allowing the gas to be removed. The rotational invariance of the mechanism makes it a good candidate for devices that do not necessarily have a defined constant direction of gravity, since it is operational in any orientation.

The prototype shown in FIG. 1C is made from a cylindrical hollow acrylic container, laser machined acrylic lids and custom silicone rubber seals. The deflector is attached to the left lid. The PTFE filter and a pipe fitting are placed on the right lid.

The critical pressure of the pneumatic battery $P_c$ is tuned based on the following theoretical study. Static plate deflection theory predicts that the deflection w of a clamped circular membrane with radius $r_m$ under a pressure difference $\Delta P = P_c - P_{in}$ is:

$$w(r) = \frac{\Delta P r_m^4}{64K}\left(1 - \left(\frac{r}{r_m}\right)^2\right)^2 \quad (1)$$

where K is the flexural rigidity and v is the Poisson's ratio of the plate. If the air chamber 16 is connected to the atmosphere, its internal pressure $P_{in}$ remains constant and this equation is enough to engineer the necessary amount of offset or membrane thickness for a given target cut-off pressure. For safety, to reduce the possibility of $H_2O_2$ leakage, this work uses a closed air chamber.

Consequently, the membrane 18 deflection decreases the volume of the air chamber 16 and increases its internal pressure due to the ideal gas law. With sufficiently thick walls, the volume V of the air chamber 16 with initial height h is solely due to the membrane 18 deflection. The pressure dependant chamber volume is written by integrating Eq. 1 over the membrane area as:

$$V = \pi r_m^2 \left(h - \frac{\Delta P r_m^4}{192K}\right) \quad (2)$$

From the ideal gas law, air chamber 16 internal pressure must satisfy:

$$\frac{r_m^4}{192K} P_{in}^2 + \left(h - \frac{P_c r_m^4}{192K}\right)P_{in} - hP_o = 0 \quad (3)$$

where $P_o$ is the initial pressure of the air chamber 16, typically equal to atmospheric pressure. The positive root of Eq. 3 is the final pressure in the air chamber 16. Given the radius of the offset boss $r_o$, the displacement of the opposite layer towards the catalyst pack 20 is calculated as $w(r_o)$ from Eq. 1. We use this theory to tune the design parameters in order to achieve a certain critical pressure suitable for the FEA actuation needs.

Figure 2:
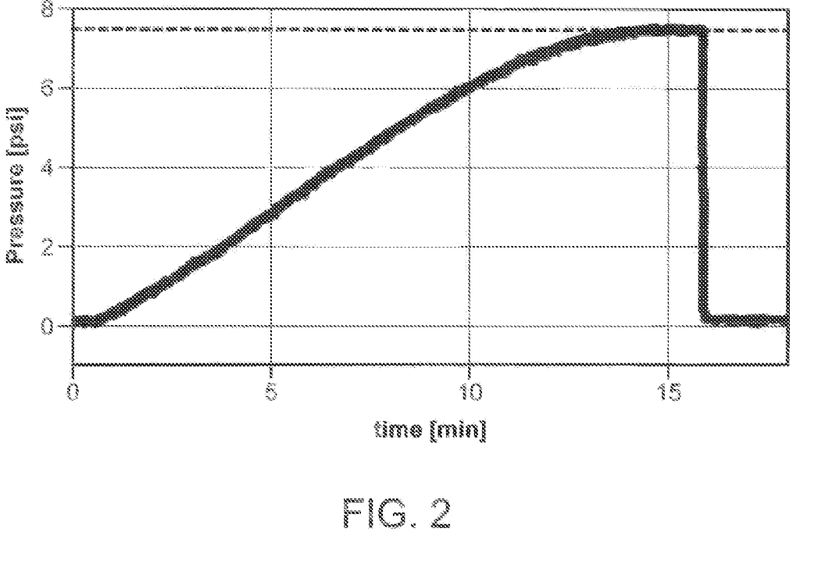
FIG. 2 is a graph of pressure against time showing pressure self-regulation in the pneumatic battery disclosed herein.

Experimental pressure self-regulation data are displayed in FIG. 2. For this demonstration, we designed a deflector such that a silicone rubber membrane with 3 mm thickness deflects for about 2.7 mm under a critical pressure of 7.5 psi. We used a boss 22 height of 2.5 mm to ensure proper conformation and sealing of the catalyst. Experimental details are described in below. The experiment used an approximately 10% $H_2O_2$ solution in water. The dashed line in FIG. 2 is the target cut-off pressure. The pneumatic battery was vented at 16 minutes.

Figure 3A:
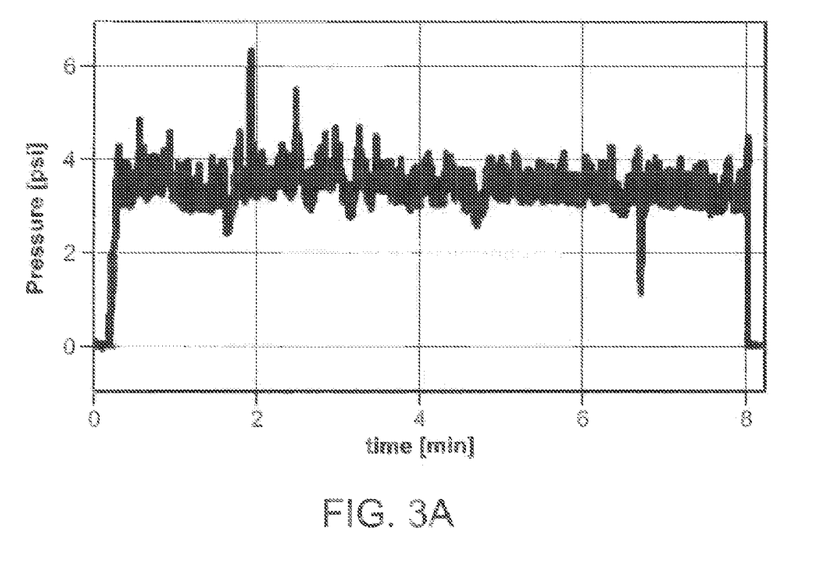
FIGS. 3A and 3B are graphs of pressure versus time showing that the pneumatic battery settles to a finite value while driving a fluidic elastomer actuator. The zoomed-up view of an experiment shows spikes in data corresponding to each actuation period as shown in FIG. 3B.
Figure 3B:
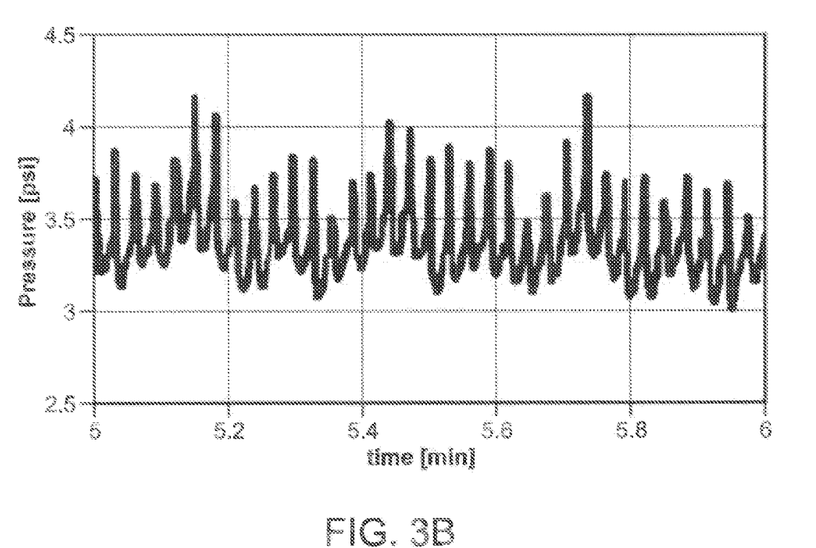
Figure 4A:
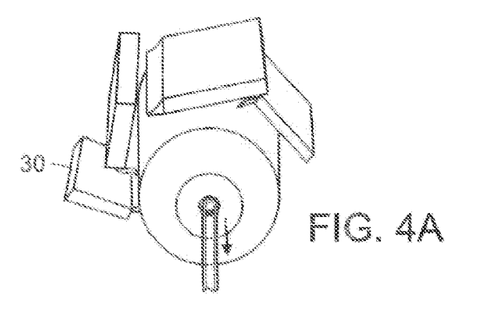
FIGS. 4A-D are a photographic sequence of a pneumatic rolling mechanism powered by the on-board hydrogen peroxide pneumatic battery disclosed herein.
Figure 4B:
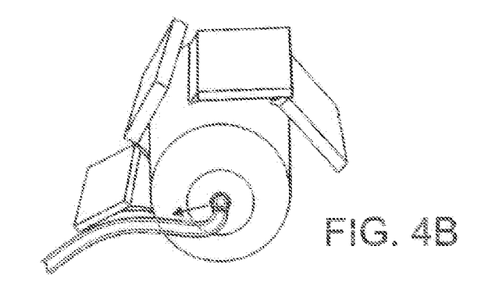
Figure 4C:
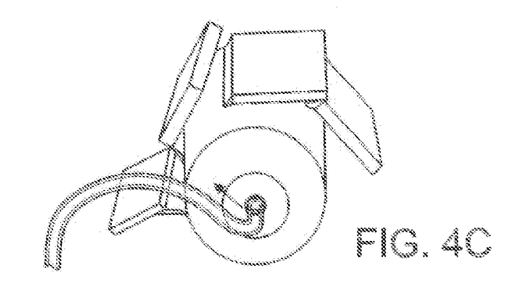
Figure 4D:
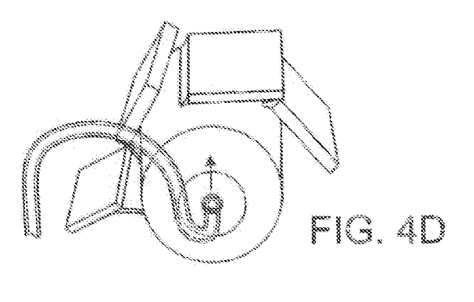

The capability of the $H_2O_2$ pneumatic battery 10 to supply pressure to an FEA is analyzed in FIG. 3. In this experiment, the pressure in the pneumatic battery is measured while fluidic channels in an elastomer are pressurized and vented continuously with an approximately 2 sec period using the generated gas. This figure depicts that the pressure generation in the pneumatic battery 10 is canceled by the gas usage of the actuator at around 3.5 psi.

The integration of the chemical pressure generator to functional devices made of fluidic elastomer actuators is exemplified by a hexagonal rolling mechanism 30 in FIG. 4. The rolling motion is also selected to underline the utility of the inherent rotational invariance in this chemical pneumatic battery design.

As shown in FIG. 4, the roller 30 is made of six bending FEAs attached on one end to the body as cantilevers. They act as flaps that bend out and apply torque to push the body forward. The hydrogen peroxide pneumatic battery 10 rests in the center and constitutes the body and the payload of the roller in addition to providing on-board pressure. The internal volume of the pneumatic battery is approximately 1.7 fl. oz. A 1 fl. oz fresh 50% $H_2O_2$ aqueous solution is used for these experiments.

Pressurized gas taken from the outlet fitting at the center of the pneumatic battery feeds an external solenoid valve array (not shown). Each FEA is actuated in order by this valve array to induce rolling. It takes around 7 sec for a single rolling step. The body travels approximately 4.75 in after three rolling steps displayed in FIG. 4.

The elastomer samples used for the experiments were 1.5 in long, 1.5 in wide, and 0.25 in thick stripes of Smooth-on™ Ecoflex™ Supersoft 0030 silicone rubber. They embedded 13 fluidic channels that were 0.04 in long, 1.3 in wide, and 0.12 in thick. The channels were connected together in a meandering arrangement.

The FEAs were fabricated by molding in two layers. Molds were created using a Stratasys™ Prodigy Plus™ fused deposition modeling system. The first layer was a 0.2 in thick elastomer with open channels on one side. The second layer was a 0.05 in thick solid elastomer, same length and width as the first piece. The two pieces were attached together in the thickness direction using an uncured thin layer of the same material as glue such that the open channels were sealed off. For a bending actuator, the second layer also embedded a fabric mesh as an inextensible thin sheet to constrain the axial deformation of this layer. The curing time for each step was about 24 h.

The bending displacement measurements were made by image processing in Matlab, using a Logitech™ Webcam Pro 9000 camera attached to a custom setup, clamping the FEAs on one end and tracking the tip of the actuator using color segmentation. The vertical position of the actuator tip was tracked for this measurement. FEAs were placed vertically, such that the bending axis coincided with the direction of gravity. Pressure measurements were made in Matlab, using a Honeywell™ ASDX030 gage pressure sensor and a National Instruments™ NI USB-6008 data acquisition system.

50% wt. $H_2O_2$ solutions were acquired from Sigma-Aldrich™ and diluted with deionized water as needed. Silver sheets were 0.008 in thick and 92.5% pure. Pneumatic battery body was an acrylic cylinder 2 in. diameter, 1/8 in. thickness. The deflector was molded in two parts from Ecoflex™ 0030 silicone rubber and glued following the same procedure as for the FEAs. The air chamber inside the deflector was sealed at ambient conditions. The filters were Whatman™ 7582-004 WTP Range PTFE membranes with 47 mm diameter and 0.2 μm pore size.

Figure 5:
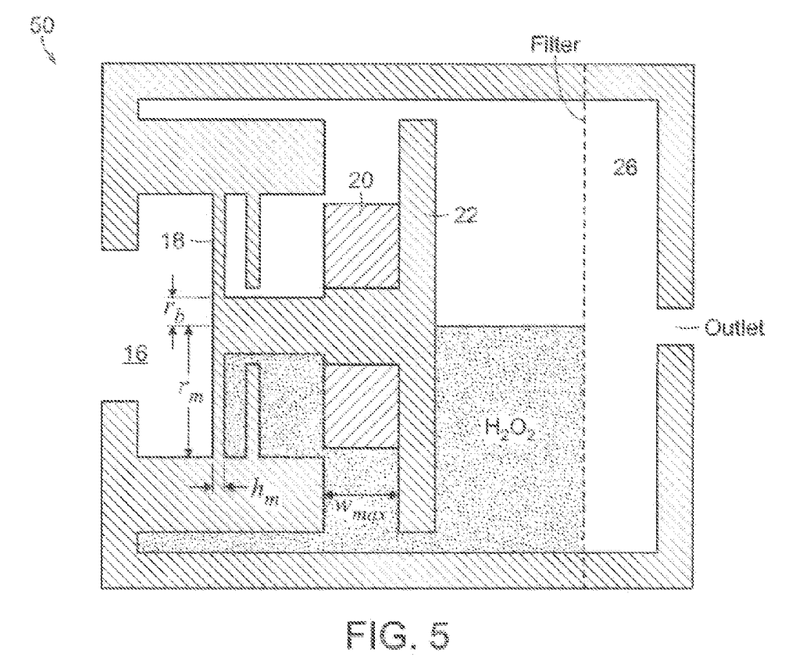
FIG. 5 is a cross-sectional view of another embodiment of the invention in which the air chamber is open to the air.

Another embodiment of the invention is shown in FIG. 5. The embodiment in FIG. 5 is very similar to the embodiment of FIG. 1. However, as shown in FIG. 5 the air chamber 16 is open to the atmosphere, unlike the closed chamber in the embodiment of FIG. 1. The air chamber 16 is open on the left side to atmospheric pressure to simplify the design for self-regulation as compared to the embodiment in FIG. 1. Further, the catalyst 20 in the embodiment of FIG. 5 is a three-dimensional hollow cylinder dial increases the catalyst surface area as compared to the earlier embodiment. It is preferred that the catalyst 20 be a platinum plated plastic since silver oxidizes and can become poisoned by some of the inhibitors in die hydrogen peroxide solution.

As with the embodiment of FIG. 1, the embodiment in FIG. 5 operates as follows. As hydrogen peroxide breaks down, pressure within the chamber will increase urging the boss 22 to the left in FIG. 5. At a selected pressure, the boss 22 will have moved sufficiently so that the catalyst 20 is now no longer in contact with the hydrogen peroxide so the reaction stops. As with the embodiment of FIG. 1, the embodiment of FIG. 5 thereby regulates pressure to a desired level.

Figure 6:
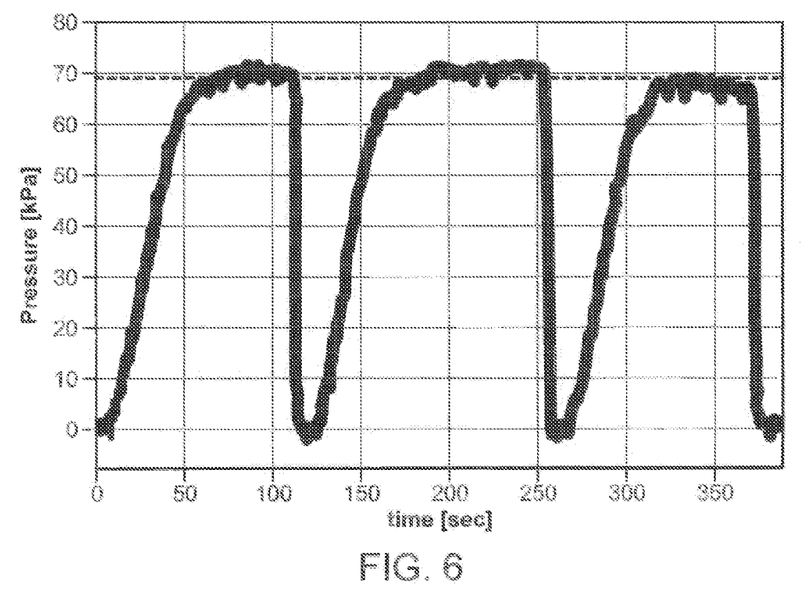
FIG. 6 is a graph of pressure versus time showing experimental results using the embodiment in FIG. 5.

The embodiment of FIG. 5 was designed to operate at a critical pressure of 68.9 kPa. Experiments were carried out and results are shown in FIG. 6. A Honeywell pressure transducer was used to monitor the pressure inside the chamber 50 during operation. FIG. 6 shows that the pressure quickly rises and converges to a constant value around a predicted cutoff pressure indicated by the dashed line. The curves in FIG. 6 demonstrate the repeatability as die cylinder is depressurized three times and similar pressure buildup curves are achieved.

Those of skill in the art will appreciate that the membrane 18 thickness can be determined using equation 1 set out earlier in this application.

Figure 7:
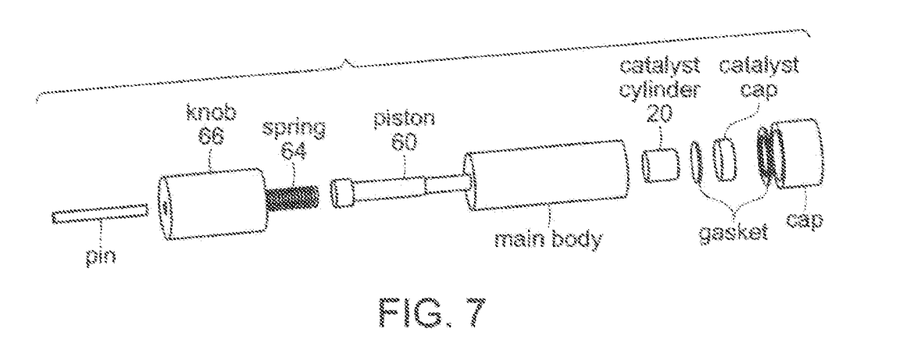
FIG. 7 is an exploded view of another embodiment of the invention disclosed herein.
Figure 8:
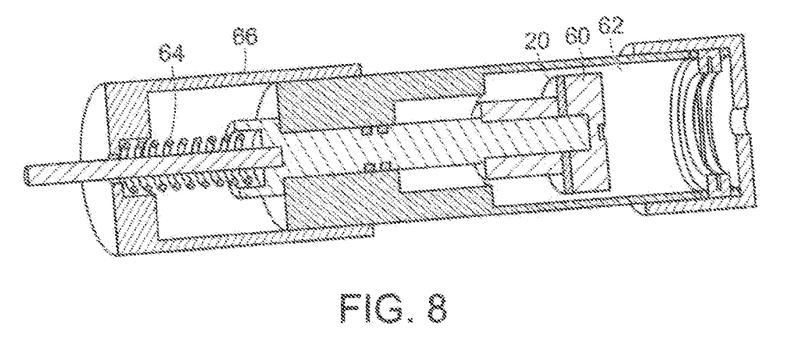
FIG. 8 is a perspective, cross-sectional view of the embodiment of the invention shown in FIG. 7.
Figure 9:
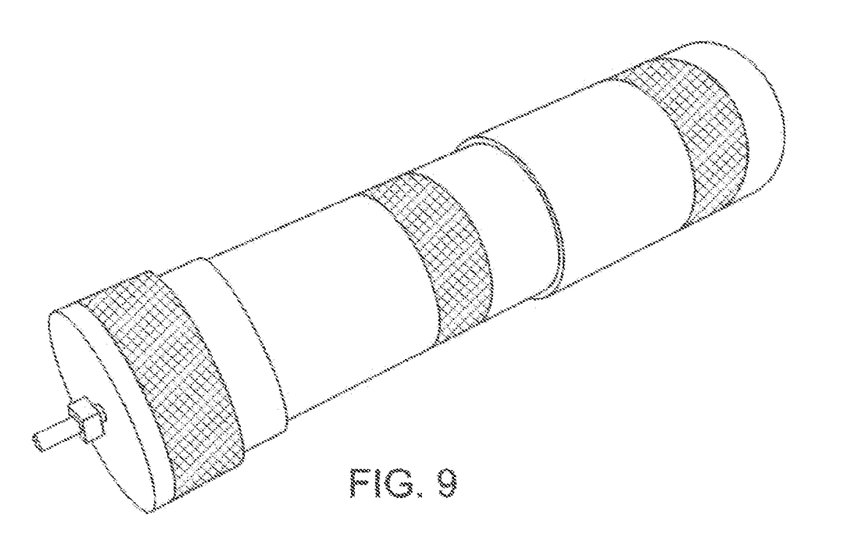
FIG. 9 is a photograph of a prototype of an embodiment of the pneumatic battery disclosed herein.

Yet another embodiment of the invention is shown in FIGS. 7 and 8. This embodiment is made of rigid material and can safely accommodate a pressure of 100 psi. As shown in FIGS. 7 and 8, a piston 60 is slidingly disposed within a cylinder 62. A catalyst 20 is disposed on the piston 60. The piston 60 is restrained by a spring 64 as can be seen in the figures. As pressure builds up within the chamber 62 the piston 60 will move toward the left until the catalyst 20 is no longer in contact with monopropellant in the chamber 62. The reaction will then stop, resulting in pressure self-regulation. The regulated pressure level may be adjusted by turning a knob 66 which compresses the spring 64 to alter the pressure set point. A filter is contemplated in this embodiment, much as the filter 26 in the embodiments of FIG. 1 and FIG. 5. The filter will keep the monopropellant solution from leaking out of the chamber 62. A suitable diameter for the chamber 62 is approximately one inch and it may be approximately five inches long. Suitable materials are aluminum or steel.

In the present invention, pressure generation was offloaded to a chemical process, namely the catalyzed decomposition of hydrogen peroxide. With a unique mechanical self-regulation mechanism, this chemical reaction is controlled to keep the pressure constant at a predefined value. This chemomechanical generator powered FEAs with no electrical energy consumption as a proof-of-concept demonstration.

Silent and portable operation of the mechanism disclosed herein provides an important step towards the common application of soft fluidic actuators in functional devices. The cheap and fast fabrication of FEAs in addition to their inherent safety makes them useful in human interactions. Potential applications include artificial muscles [15], assistive or rehabilitative devices, haptic or tactile displays and interfaces. Such applications will benefit from a distributed arrangement of these actuators in arbitrary 3D shapes.

Silver oxidizes when exposed to air, which leads to catalyst degradation. Switching to an alternative catalyst such as platinum may be one solution. Also, it has been suggested that a high pH may help this reaction and tin becomes an effective catalyst in a basic solution [4]. A thorough investigation of the pressure build-up rate in the pneumatic battery for different catalysts and pH values is necessary for optimized operation.

We haven't considered the temperature in the pneumatic battery. Especially for high $H_2O_2$ concentrations, the temperature increase becomes large and may affect the cut-off pressure value. An open air chamber circumvents this problem, with a potential loss of safety from peroxide leakage.

The present invention is an example of green/clean technology in that the pressure source does not discharge any harmful emissions or byproducts. Because of the high theoretical density of hydrogen peroxide, the energy density of the pressure source disclosed herein is comparable to the energy density of lithium batteries. As a portable pressure (energy) source, the invention has primary application for pressure operated machinery, soft pueumatic/hydraulic robots and devices, injection systems and medical devices. The invention can also be used for oxygen generation, which will eliminate the need for high pressure tanks but can still offer high oxygen density in some applications. The invention can thus be used by astronauts, scuba divers, and search and rescue personnel.

The structures of the present invention also generate heat because of the exothermic reaction of the monopropellant. An application can be for personal portable heaters such as hand warmers or for use in small heat engines and for electricity generation. The devices of the invention can be modified slightly to generate other gasses, including, but not limited to, nitrogen, $CO_2$ or hydrogen. Hydrogen especially can further be used for flotation in lighter-than-air flyers, and in hydrogen fuel cells. The present invention may also be used to generate electricity by using the hydrogen peroxide directly in a half fuel cell arrangement. Further, the pressurized gas could be used in micro turbines to generate electricity for portable electronics. By changing the gas output to hydrogen, the invention can supply hydrogen for fuel cells. Further, the heat output of the devices disclosed herein can be converted to electricity if desired.

It is recognized that modifications and variations of the invention disclosed herein will be apparent to those of ordinary skill in the art. It is intended that all such modifications and variations be included within the scope of the appended claims.

References

1. Wait K, Jackson P, Smoot L (2010) Self locomotion of a spherical rolling robot using a novel deformable pneumatic method pp 3757-3762.
2. Kazerooni H (2005) Design and analysis of pneumatic force generators for mobile robotic systems. IEEE/ASME Transactions on Mechatronics 10:411-418.
3. Whitehead J C (1998) Hydrogen peroxide propulsion for smaller satellites.
4. Vitale F, et al. (2010) Low-temperature H2O2-powered actuators for biorobotics: thermodynamic and kinetic analysis pp 2197-2202.
5. Goldfarb M, Barth E J, Gogola M A, Wehrmeyer J A (2003) Design and energetic characterization of a liquid-propellant-powered actuator for self-powered robots. IEEE/ASME Transactions on Mechatronics 8:254-262.
6. Wang Y, et al. (2006) Bipolar electrochemical mechanism for the propulsion of catalytic nanomotors in hydrogen peroxide solutions. Langmuir 22:10451-10456.
7. Qin L, Vermesh O, Shi Q, Heath J R (2009) Self-powered microfluidic chips for multiplexed protein assays from whole blood. Lab on a Chip 9:2016-2020.
8. Salem I A, El-Maazawi M, Zaki A B (2000) Kinetics and mechanisms of decomposition reaction of hydrogen peroxide in presence of metal complexes. Int J Chem Kin 32:643-666.
9. Albu-Schaffer A, et al. (2008) Soft robotics. IEEE Robotics & Automation Magazine 15:20-30.
10. Bar-Cohen Y (2004) Electroactive Polymer EAP Actuators as Artificial Muscles: Reality, potential and challenges (SPIE Press, 2nd edition).
11. Pelrine R, Kornbluh R, Pei Q, Joseph J (2000) High-Speed Electrically Actuated Elastomers with Strain Greater Than 100%. Science 287:836-839.
12. Keplinger C, Kaltenbrunner M, Arnold N, Bauer S (2010) Rontgens electrode-free elastomer actuators without electromechanical pull-in instability. PNAS 107:4505-4510.
13. Richards A W, Odegard G M (2010) Constitutive modeling of electrostrictive polymers using a hyperelasticity-based approach. Journal of Applied Mechanics 77:014502.
14. Fu Y, Harvey E C, Ghantasala M K, Spinks G M (2006) Design, fabrication and testing of piezoelectric polymer pvdf microactuators. Smart Materials and Structures 15:S141.
15. Trivedi D, Rahn C, Kier W, Walker I (2008) Soft robotics: Biological inspiration, state of the art, and future research. Advanced Bionics and Biomechanics 5:99-117.
16. Oh K W, Ahn C H (2006) A review of microvalves. Journal of Micromechanics and Microengineering 16:R13.
17. Mosadegh B, et al. (2010) Integrated elastomeric components for autonomous regulation of sequential and oscillatory flow switching in microfluidic devices. Nature Physics 6:433-437.
18. Thorsen T, Maerkl S J, Quake S R (2002) Microfluidic Large-Scale Integration. Science 298:580-584.
19. Chiechi R C, Weiss E A, Dickey M D, Whiteside G M (2008) Eutectic gallium-indium (egain): A moldable liquid metal for electrical characterization of self-assembled monolayers. Angewandte Chemie 47:142-144.

What is claimed is:

1. Self-regulating pressure source comprising:
a chamber enclosing a chemical monopropellant;
a movable boss attached to a deformable membrane sealing an air chamber, the moveable boss and air chamber disposed within the chamber;
a catalyst disposed around the membrane so as to be covered by the boss in a retracted position;
wherein as the monopropellant is broken down by the catalyst to produce a gas, pressure will increase within the chamber causing air in the air chamber to compress thereby to pull the boss into the retracted position to cover the catalyst thereby to regulate the pressure within the chamber.

2. The pressure source of claim 1 wherein the monopropellant is hydrogen peroxide.

3. The pressure source of claim 1 further including an opening in the chamber to allow the gas to leave the chamber.

4. The pressure source of claim 3 further including a filter proximate the opening, the filter impervious to liquids while allowing gas to pass.

5. The pressure source of claim 1 wherein the chamber is cylindrical.

6. The pressure source of claim 4 wherein the filter is PTFE.

7. The pressure source of claim 1 wherein the pressure source is operatively connected to an actuator.

8. The pressure source of claim 7 wherein the actuator is a fluidic elastomer actuator.

9. The pressure source of claim 1 wherein the catalyst is silver.

10. The pressure source of claim 1 wherein the air chamber is open to the atmosphere.

11. Fluidic elastomer actuator comprising:
an elastomeric structure including fluidic channels embedded therein; and
a pressure source for pressurizing the fluidic channels;
wherein the pressure source comprises a chamber enclosing a chemical monopropellant;
a moveable boss attached to a deformable membrane sealing an air chamber, the moveable boss and air chamber disposed within the chamber;
a catalyst disposed around the membrane so as to be covered by the boss in a retracted position;
wherein as the monopropellant is broken down by the catalyst to produce a gas, pressure will increase within the chamber causing air in the air chamber to compress thereby to pull the boss into the retracted position to cover the catalyst thereby to regulate the pressure within the chamber.

12. Self-regulating pressure source comprising:
a chamber enclosing a chemical monopropellant;
a piston slidingly disposed within the chamber and restrained by a spring, the piston including a catalyst portion;
wherein as the monopropellant is broken down by the catalyst to produce a gas, pressure will increase within the chamber thereby moving the piston into a position covering the catalyst, thereby to regulate the pressure within the chamber.

\* \* \* \* \*